(12) United States Patent
Akisada et al.

(10) Patent No.: US 12,108,139 B2
(45) Date of Patent: Oct. 1, 2024

(54) APPARATUS, SYSTEM, METHOD AND STORAGE MEDIUM

(71) Applicant: Yokogawa Electric Corporation, Tokyo (JP)

(72) Inventors: Yukiyo Akisada, Tokyo (JP); Yasuki Sakurai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 400 days.

(21) Appl. No.: 17/457,674

(22) Filed: Dec. 6, 2021

(65) Prior Publication Data

US 2022/0201194 A1 Jun. 23, 2022

(30) Foreign Application Priority Data

Dec. 23, 2020 (JP) ................. 2020-214218

(51) Int. Cl.
| | | |
|---|---|---|
| *H04N 23/611* | (2023.01) | |
| *G05D 1/00* | (2006.01) | |
| *H04N 23/63* | (2023.01) | |
| *H04N 23/69* | (2023.01) | |
| *H04N 23/695* | (2023.01) | |

(52) U.S. Cl.
CPC ......... *H04N 23/611* (2023.01); *G05D 1/0094* (2013.01); *G05D 1/12* (2013.01); *H04N 23/632* (2023.01); *H04N 23/69* (2023.01); *H04N 23/695* (2023.01)

(58) Field of Classification Search
None
See application file for complete search history.

(56) References Cited

U.S. PATENT DOCUMENTS

| | | | | |
|---|---|---|---|---|
| 2005/0159841 | A1* | 7/2005 | Yasukawa | B25J 5/007 700/245 |
| 2010/0321482 | A1* | 12/2010 | Cleveland | H04N 23/63 348/78 |
| 2017/0339348 | A1 | 11/2017 | Shimizu | |

FOREIGN PATENT DOCUMENTS

| | | |
|---|---|---|
| JP | 2006202181 A | 8/2006 |
| JP | 4835898 B2 | 12/2011 |
| JP | 2012118188 A | 6/2012 |
| JP | 2013192184 A | 9/2013 |
| JP | 2017151672 A | 8/2017 |
| JP | 2017212495 A | 11/2017 |
| JP | 6241107 B2 | 12/2017 |
| JP | 2019121991 A | 7/2019 |

(Continued)

OTHER PUBLICATIONS

Office Action issued for counterpart Japanese Application No. 2020-214218, transmitted from the Japanese Patent Office on Jul. 4, 2023 (drafted on Jun. 26, 2023).

(Continued)

*Primary Examiner* — Edward Park (57) ABSTRACT

An apparatus comprising an acquisition unit configured to acquire a captured image from a camera that is capable of controlling an orientation, a display control unit configured to display the captured image onto a display screen, a detection unit configured to detect, within the display screen, a subject at which a user is looking, and an orientation changing unit configured to change an orientation of the camera in such a way that the subject does not fall out of an imaging region of the camera is provided.

20 Claims, 4 Drawing Sheets

(56) References Cited

FOREIGN PATENT DOCUMENTS

| | | | |
|---|---|---|---|
| JP | 2019208197 A | 12/2019 | |
| WO | 2019087870 A1 | 5/2019 | |

OTHER PUBLICATIONS

Office Action issued for counterpart Japanese Application No. 2020-214218, issued by the Japanese Patent Office on Jan. 10, 2023 (drafted on Dec. 26, 2022).
Extended European Search Report for European Patent Application No. 21215069.2, issued by the European Patent Office on May 20, 2022.

* cited by examiner

APPARATUS, SYSTEM, METHOD AND STORAGE MEDIUM

The contents of the following Japanese patent application(s) are incorporated herein by reference:
2020-214218 filed in JP on Dec. 23, 2020

BACKGROUND

1. Technical Field

The present invention relates to an apparatus, a system, a method, and a recording medium.

2. Related Art

It is described in patent literature 1 that "the location (area) on the monitor 11 at which the user is gazing is estimated by detecting the line of sight of the user. And an AF process is performed in which focus is brought on a subject in a predetermined range including the gaze location".

PRIOR ART LITERATURE

Patent Literature

[Patent Literature 1] Japanese Patent No. 6241107

SUMMARY

In the first aspect of the present invention, an apparatus is provided. The apparatus may include an acquisition unit configured to acquire a captured image from a camera that is capable of controlling an orientation. The apparatus may include a display control unit configured to display the captured image onto a display screen. The apparatus may include a detection unit configured to detect, within the display screen, a subject at which a user is looking. The apparatus may include an orientation changing unit configured to change the orientation of the camera in such a way that the subject does not fall out of an imaging region of the camera.

In a second aspect of the present invention, a system is provided. The system may include the apparatus according to the first aspect. The system may include a camera that is capable of controlling an orientation. The system may include a communication apparatus configured to transmit, to the apparatus, the image captured by the camera.

In a third aspect of the present invention, a method is provided. The method may include acquiring a captured image from a camera that is capable of controlling an orientation. The method may include controlling display by causing the captured image to be displayed onto a display screen. The method may include detecting, within the display screen, a subject at which the user is looking. The method may include changing an orientation of the camera in such a way that the subject does not fall out of an imaging region of the camera.

In a fourth aspect of the present invention, a recording medium having recorded thereon a program is provided. The program may cause a computer to function as an acquisition unit configured to acquire a captured image from a camera that is capable of controlling an orientation. The program may cause a computer to function as a display control unit configured to display the captured image onto a display screen. The program may cause a computer to function as a detection unit configured to detect, within the display screen, a subject at which a user is looking. The program may cause a computer to function as an orientation changing unit configured to change an orientation of the camera in such a way that the subject does not fall out of an imaging region of the camera.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments necessarily have to be essential to solving means of the invention.

1. Configuration of Watching System 1

Figure 1:
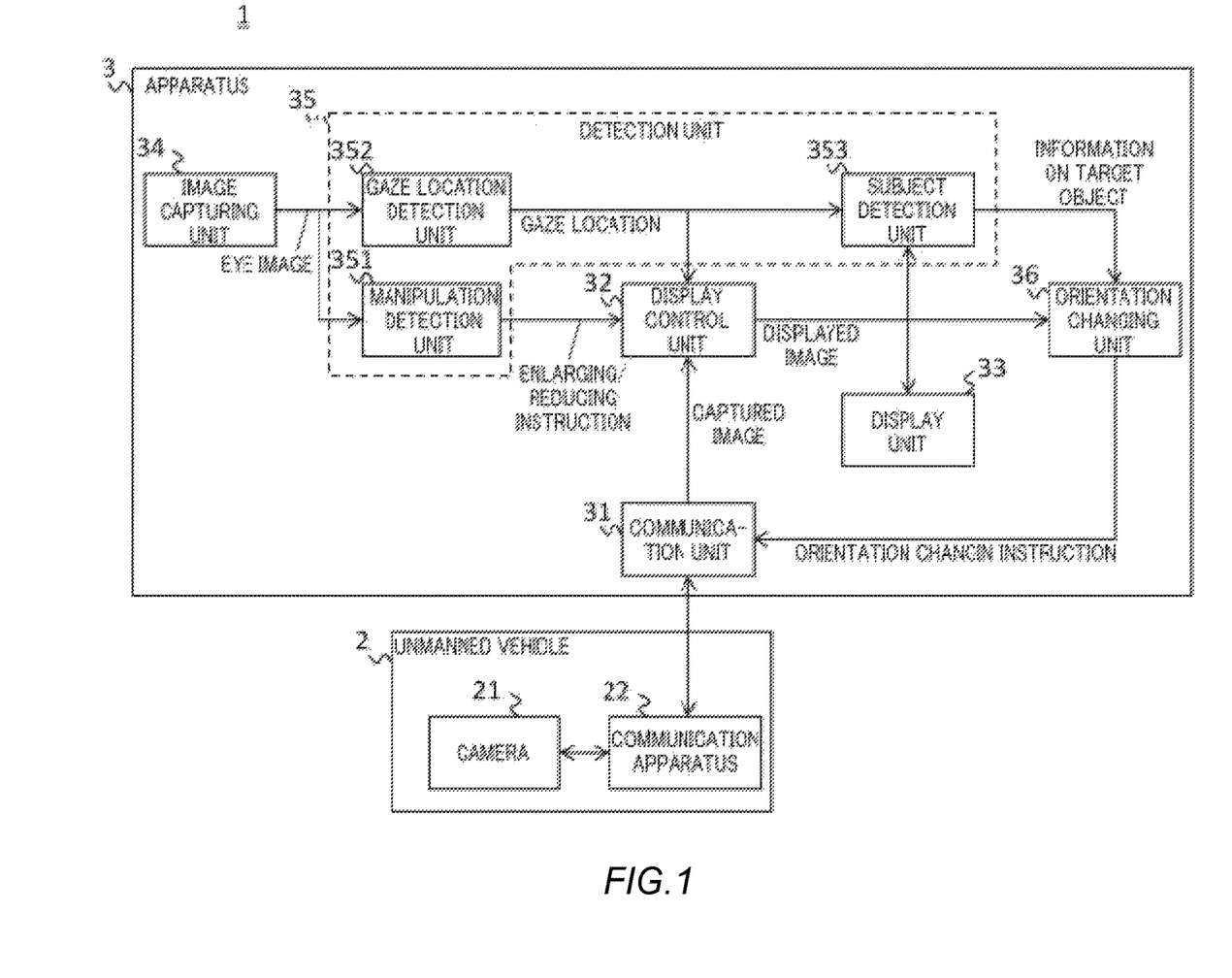
FIG. 1 illustrates a watching system 1 according to the present embodiment.

FIG. 1 illustrates a watching system 1 according to the present embodiment. The watching system 1 performs watching over a plant, and includes an unmanned vehicle 2 and an apparatus 3.

Here, the plant includes, in addition to an industrial plant such as a chemical industrial plant, a plant for managing and controlling a wellhead such as a gas field and oil field and its surroundings, a plant for managing and controlling an electrical power generation such as water power, fire power, and nuclear power, a plant for managing and controlling an energy harvesting such as photovoltaic power generation and wind-power generation, and a plant for managing and controlling a water and sewerage, a dam or the like, and the like.

[1.1. Unmanned Vehicle 2]

The unmanned vehicle 2 moves in the plant. The unmanned vehicle 2 may move over a preset route within the plant. The unmanned vehicle 2 may be able to move autonomously, or may be able to be remotely controlled by an operational apparatus that is not illustrated or the apparatus 3.

The unmanned vehicle 2 may be an unmanned aerial vehicle (UAV) (also referred to as a drone), may be an unmanned ground vehicle (UGV), may be an unmanned surface vehicle (USV), or may be an unmanned underwater vehicle (UUV). The unmanned vehicle 2 has a camera 21 and a communication apparatus 22.

[1.1 (1). Camera 21]

The camera 21 performs image-capturing and supplies the captured image to the communication apparatus 22. In the present embodiment, as one example, the camera 21 may constantly perform image-capturing to generate a moving image (also referred to as a video). The camera 21 may be capable of controlling the orientation (also referred to as image-capturing direction), and in the present embodiment, as one example, may change the orientation in accordance with the orientation changing instruction described below supplied from the communication apparatus 22.

[1.1 (2). Communication Apparatus 22]

The communication apparatus 22 communicates with the apparatus 3 in a wireless or wired manner.

The communication apparatus 22 may transmit the image captured by the camera 21 to the apparatus 3. In the present embodiment, as one example, the communication apparatus 22 successively transmits the captured image to the apparatus 3, but may also transmit the captured image at a reference interval (every ten seconds, for example). In addition, the communication apparatus 22 may receive the orientation changing instruction from the apparatus 3 and supply the same to the camera 21.

[1.2. Apparatus 3]

The apparatus 3 supports the watching of the plant using the unmanned vehicle 2. The apparatus 3 has a communication unit 31, a display control unit 32, a display unit 33, an image capturing unit 34, a detection unit 35, and an orientation changing unit 36. It should be noted that the apparatus 3 may be arranged in a control room, a meter room or the like in the plant. In the present embodiment, as one example, the apparatus 3 may be a stand-alone PC or the like.

[1. 2 (1). Communication Unit 31]

The communication unit 31 communicates with the communication apparatus 22 of the unmanned vehicle 2 in a wireless or wired manner. The communication unit 31 is one example of the acquisition unit, and acquires a captured image from the camera 21 via the communication apparatus 22. The communication unit 31 may supply the captured image to the display control unit 32. In addition, the communication unit 31 may transmit the orientation changing instruction supplied from the orientation changing unit 36 described below, to the communication apparatus 22.

[1. 2 (2). Display Control Unit 32]

The display control unit 32 controls the display unit 33. The display control unit 32 may supply an image to be displayed (also referred to as the displayed image) to the display unit 33 and cause it to be displayed on the display screen. The displayed image may be the image captured by the camera 21 itself, for example.

The display control unit 32 may be one example of the size changing unit, and may change the size of the subject within the display screen in accordance with the zooming operation. In the present embodiment, as one example, the size of the subject may be changed by acquiring instructions on enlarging (also referred to as zooming in) or reducing (also referred to as zooming out) in accordance with the zooming operation, from the detection unit 35.

The display control unit 32 may change the size of the subject by digital zooming. For example, in response to acquiring an enlarging instruction, the display control unit 32 may supply, to the display unit 33, an image having a smaller area than the area that is currently being displayed, among the captured images supplied from the communication unit 31, and cause it to be displayed in an enlarged manner. In response to acquiring a reducing instruction, the display control unit 32 may supply, to the display unit 33, an image having a larger area than the area that is currently being displayed, among the captured images supplied from the communication unit 31, and cause it to be displayed in a reduced manner. In this case, the displayed image to be supplied to the display unit 33 may be a portion of an image to be displayed in an enlarged manner among the captured images. The display control unit 32 may also supply the displayed image to the detection unit 35 and the orientation changing unit 36.

[1. 2 (3). Display Unit 33]

The display unit 33 displays the displayed image supplied from the display control unit 32 onto the display screen. The display unit 33 may further display other contents.

[1. 2 (4). Image Capturing Unit 34]

The image capturing unit 34 captures the eyes of the user. The image capturing unit 34 may supply a captured image of the eyes to the detection unit 35. It should be noted that, in the present embodiment, as one example, the image capturing unit 34 is provided on an outer peripheral portion of the display screen of the display unit 33, but it may be provided on other locations.

[1. 2 (5). Detection Unit 35]

The detection unit 35 performs various types of detection based on the image of the eyes. The detection unit 35 has a manipulation detecting unit 351, a gaze location detection unit 352, and a subject detection unit 353.

[1. 2 (5-1). Manipulation Detecting Unit 351]

The manipulation detecting unit 351 detects a zooming operation to the subject from the eye movement of the user. The manipulation detecting unit 351 may detect the zooming operation by using an image of the eyes supplied from the image capturing unit 34. The zooming operation may be both of the zooming in operation and the zooming out operation.

The manipulation detecting unit 351 may detect the zooming in operation in accordance with the user squinting one's eyes for a first reference duration (for example, 0.5 seconds), and may detect the zooming out operation in accordance with the widening of one's eyes. The detection unit 35 may detect the zooming in operation in accordance with the user blinking their eyes at a frequency that is equal to or higher than a reference frequency (three times per second, for example). The manipulation detecting unit 351 may supply an enlarging or reducing instruction to the display control unit 32 in response to detection of the zooming operation.

[1. 2 (5-2). Gaze Location Detection Unit 352]

The gaze location detection unit 352 detects the gaze location at which the user is looking within the display screen.

The gaze location detection unit 352 may detect the line of sight of the user. In the present embodiment, as one example, the gaze location detection unit 352 may detect the line of sight by analyzing the image of the eyes supplied from the image capturing unit 34. The gaze location detection unit 352 may determine the location on the display screen where the detected line of sight passes as the gaze location. The gaze location detection unit 352 may supply the location information of the detected gaze location (the coordinates within the display screen, for example) to the subject detection unit 353 and the display control unit 32.

[1.2 (5-3). Subject Detection Unit 353]

The subject detection unit 353 detects, within the display screen, the subject (also referred to as a target object) at which the user is looking. For example, the subject detection unit 353 may prestore captured images and feature data of the appearances for each of the equipment and facilities in the plant. The subject detection unit 353 may acquire the displayed image from the display control unit 32, and compare with the prestored captured images and feature data the appearances of the subject acquired by performing image processing such as edge extraction processing on the area including the gaze location, among the subjects included in the displayed image, thereby detecting the target object. Alternatively, a unique code may be provided in advance on the outer surface of each of the equipment or facilities in the plant, and the subject detection unit 353 may detect the target object by analyzing the code detected from the outer surface of the subject acquired by performing image processing such as edge extraction processing on the area including the gaze location. The code may be a barcode, a two-dimensional code (a QR code (registered trademark), for example) or the like, and may be provided on the equipment or facilities by at least one of attaching, printing, or engraving.

The subject detection unit 353 may supply information on the detected target object to the orientation changing unit 36. The information on the target object may be feature data of the subject, may be location coordinates data of the subject within the captured image, or may be a preset identification number for the equipment or facilities in the plant.

[1. 2 (6). Orientation Changing Unit 36]

The orientation changing unit 36 changes the orientation of the camera 21 in such a way that the target object does not fall out of the imaging region of the camera 21. For example, the orientation changing unit 36 may change the orientation of the camera 21 in such a way that the target object is located in a middle section of the imaging region. The orientation changing unit 36 may change the orientation of the camera 21 by supplying an orientation changing instruction of the camera 21 to the camera 21 via the communication unit 31.

According to the above apparatus 3, the target object can be certainly fit in the captured image since the target object at which the user is looking is detected within the display screen in which the captured image is displayed, and the orientation of the camera 21 is changed in such a way that the target object does not fall out of the imaging region.

In addition, the target object can be fit in the middle section of the captured image since the orientation of the camera 21 is change in such a way that the target object is located in the middle section of the imaging region.

In addition, the camera 21 and the communication apparatus 22 are mounted on the unmanned vehicle 2, so the target object can be certainly fit in the captured image by the camera 21 mounted on the unmanned vehicle 2.

In addition, the unmanned vehicle 2 moves over a preset route, so the target object existing on the route can be certainly fit in the captured image by the camera 21 of the unmanned vehicle.

In addition, the size of the target object within the display screen is changed in accordance with the zooming operation detected from the eye movement of the user, so it is possible to see the captured image of the target object at any magnification according to the eye movements.

2. Operation

Figure 2:
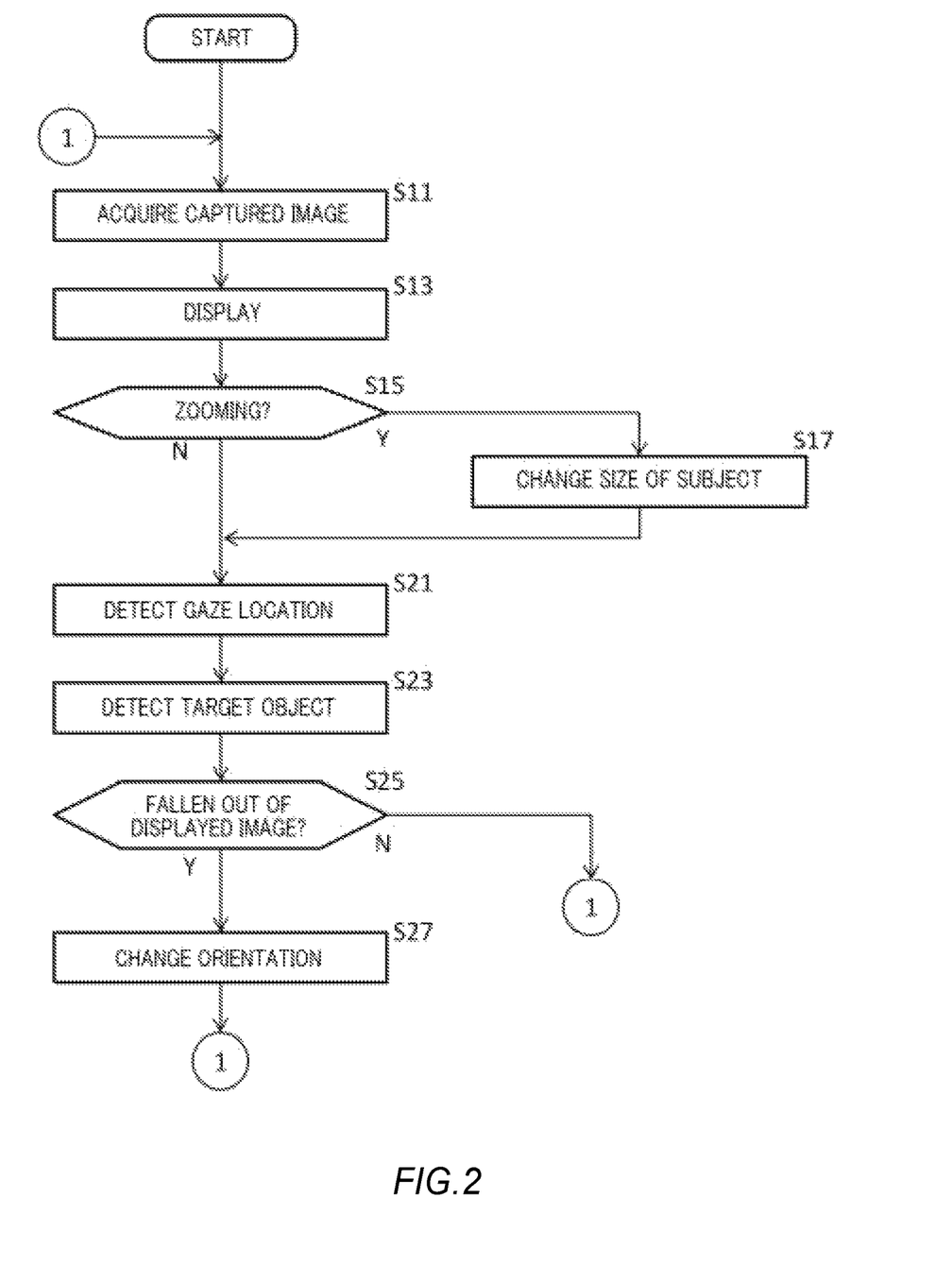
FIG. 2 illustrates an operation of an apparatus 3.

FIG. 2 illustrates the operation of the apparatus 3. The apparatus 3 performs watching of the plant by the process of steps S11 to S27.

At step S11, the communication unit 31 acquires a captured image from the camera 21 of the unmanned vehicle 2, and at step S13, the display control unit 32 causes the captured image to be displayed onto the display screen. It should be noted that, in a case where the size of the target object is changed at step S17 described below, the display control unit 32 may cause the displayed image of partial region of the captured image to be displayed onto the display screen in such a way that the size of the subject is maintained.

At step S15, the display control unit 32 judges whether a zooming operation has been detected by the manipulation detecting unit 351. In a case where it is judged that no zooming operation is detected (step S15; N), the process may transition to step S21. In a case where it is judged that a zooming operation is detected (step S15; Y), the process may transition to step S17.

At step S17, the display control unit 32 changes the size of the target object within the display screen in accordance with the zooming operation. The display control unit 32 may change the size of the target object in a stepwise manner, and may increase or reduce the display size of the target object by one step in response to the zooming operation performed once. The display control unit 32 may enlarge or reduce the captured image in such a way that the gaze location does not fall out of the display screen, based on the location information of the gaze location supplied from the gaze location detection unit 352. As one example, the gaze location detection unit 352 detects, within the display screen, the gaze location at which the user is looking, and the display control unit 32 may enlarge or reduce the captured image by using the detected gaze location as a reference point. Enlarging or reducing the captured image by using the gaze location as a reference point may be enlarging or reducing the captured image in such a way that the subject at the gaze location does not move.

At step S21, the gaze location detection unit 352 detects, within the display screen, the gaze location at which the user is looking. It should be noted that, in a case where the gaze location is already detected by the gaze location detection unit 352 in the process of step S17, the gaze location detection unit 352 does not have to newly detect a gaze location.

At step S23, the subject detection unit 353 detects, within the display screen, the target object at which the user is looking. The subject detection unit 353 may compare with the prestored captured images and feature data the appearances of the subject acquired by performing image processing such as edge extraction processing on the area including the gaze location, among the subjects included in the displayed image, thereby detecting the target object.

The subject detection unit 353 may detect said subject as the target object in accordance with the fact that the same subject was continuously looked at by the user for a second reference duration or longer to the present time. After a first subject is detected as the target object, in a case where the user looked at a second subject for a time period that is less than a second reference duration, the subject detection unit 353 may maintain the first subject as the target object. The second reference duration may be the same as or different from the first reference duration (for example, 0.5 seconds) for which the zooming operation is detected by the manipulation detecting unit 351. As one example, the second reference duration may be one second.

At step S25, the orientation changing unit 36 judges whether the target object falls out of the displayed image, in other words, whether the target object falls out of the display screen. For example, the orientation changing unit 36 may calculate the moving speed of the target object within the displayed image from the transition of the displayed image supplied from the display control unit 32 to judge whether the target object falls out of the displayed image after a third reference duration has elapsed. The third reference duration may be the same as or different from the second reference duration (for example, one second) for which the target object is detected by the subject detection unit 353 or the first reference duration (for example, 0.5 seconds) for which the zooming operation is detected by the manipulation detecting unit 351. As one example, the third reference duration may be 0.5 seconds. It should be noted that, at step S25, the orientation changing unit 36 may judge whether the target object falls out of the middle section of the displayed image or whether the target object has fallen out of the middle section of the displayed image.

In a case where it is judged at step S25 that the target object does not fall out of the displayed image (step S25; N), the process may transition to step S11. In a case where it is judged that the target object falls out of the displayed image (step S25; Y), the process may transition to step S27.

At step S27, the orientation changing unit 36 changes the orientation of the camera 21 in such a way that the target object does not fall out of the imaging region of the camera 21. The orientation changing unit 36 may change the orientation of the camera 21 in such a way that the target object is located in a middle section of the imaging region. In the present embodiment, as one example, the orientation changing unit 26 may change the orientation of the camera 21 in such a way that the target object does not fall out of the displayed image, and the orientation changing unit 26 may preferably change the orientation of the camera 21 in such a way that the target object is located in the middle section of the displayed image. After the process of step S27 is completed, the process may transition to step S11.

3. Example of Display Screen

Figure 3:
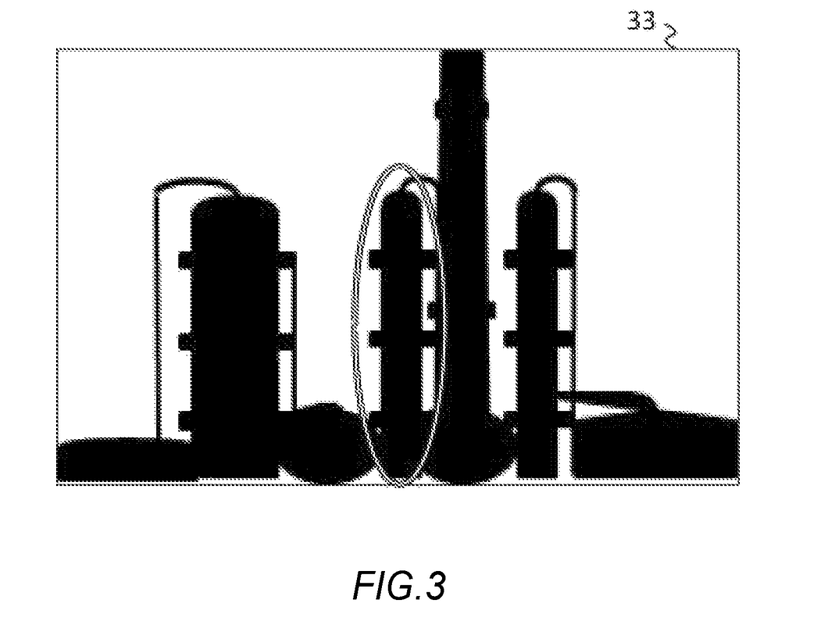
FIG. 3 illustrates an example of a display screen.

FIG. 3 illustrates an example of a display screen. As illustrated in this figure, in a state where the appearances of the plant captured by the camera 21 of the unmanned vehicle 2 is displayed on the display screen, when the user gazes at the subject surrounded with the double-line frame in the figure, the orientation of the camera 21 is changed in such a way that that this subject does not fall out of the imaging region.

4. Variation Example

It should be noted that, the apparatus 3 has been discussed as having the display unit 33 in the embodiment disclosed above, but the apparatus 3 may not have the display unit 33. In this case, the display control unit 32 may cause the captured image to be displayed on a display apparatus that is connected externally.

In addition, the gaze location detection unit 352 has been discussed as detecting the line of sight of the user from a captured image of the eyes, the gaze location detection unit 352 may detect the line of sight by other methods. In this case, the apparatus 3 may not have the image capturing unit 34, and the gaze location detection unit 352 may have a sensor group (not illustrated) configured to detect the line of sight of the user or the gaze location of the eyes. The sensor group may include a 6-axis sensor, a magnetic sensor, an electro-oculogram sensor or the like to be worn on the head of the user (for example, around the eyes). The 6-axis sensor may be a motion sensor (also referred to as an inertial sensor) having a 3-axis acceleration sensor and a 3-axis gyro (angular velocity) sensor, and may detect the orientation of the head of the user. The magnetic sensor may be, for example, a 3-axis geomagnetic sensor. The electro-oculogram sensor may detect a potential difference around the eyes, to thereby detect the direction of the eyeball. The gaze location detection unit 352 may use these sensors to detect the line of sight by conventional known methods. For example, in a case where the sensor group includes the 6-axis sensor or the magnetic sensor, the gaze location detection unit 352 may detect the location of a midpoint between the eye and the orientation of the head, and detect the straight line through the midpoint between the eyes toward the front side of the head as the line of sight. In a case where the sensor group further includes the electro-oculogram sensor, the gaze location detection unit 352 may detect the midpoint between the eyes and the gaze location of the eyes, and detect the straight line connecting the midpoint between the eyes and the gaze location of the eyes as the line of sight.

In addition, the watching system 1 has been discussed as comprising a single unmanned vehicle 2, but the watching system 1 may comprise a plurality of unmanned vehicles 2. In this case, images captured by the cameras 21 of respective unmanned vehicles 2 may be displayed on the display screen.

In addition, the apparatus 3 has been discussed as a stand-alone PC, but the apparatus 3 may be any other apparatus such as a mobile terminal, and as one example, may be a wearable terminal including a head mounted display.

In addition, the camera 21 has been discussed as constantly performing image-capturing, but the camera 21 may perform image-capturing at regular timing, or may perform image-capturing at timing of shutter of operation performed on an operational apparatus that is not illustrated or the apparatus 3. In addition, the camera 21 has been discussed as generating a moving image, the camera 21 may generate a still image.

In addition, the camera 21 has been discussed as being mounted on a movable unmanned vehicle 2, the camera 21 may be a monitoring camera as long as it is capable of controlling the orientation. In this case, the subject existing within the monitoring area by the monitoring camera can certainly be fit in the captured image. It should be noted that, the monitoring camera may be arranged on the road, at a parking lot, on an electric light, or on an electric pole, or may be arranged at the doorway, a passage, or the like of the facility. The facility may be a plant, may be a school, a house, a station, an airport, a museum, a hospital, a store or the like, or may be a theme park, an amusement park, or an attraction facility thereof or the like.

Also, various embodiments of the present invention may be described with reference to flowcharts and block diagrams. Blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 4:
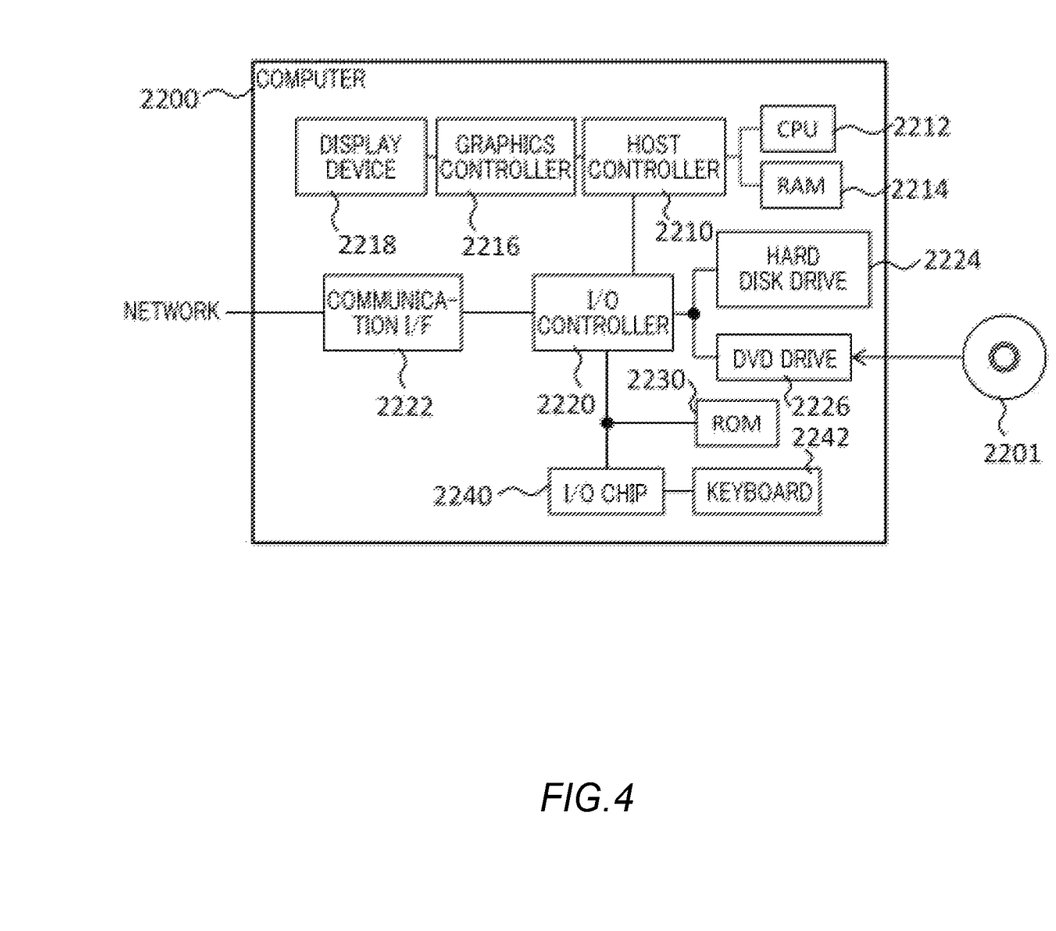
FIG. 4 illustrates an example of a computer 2200 in which a plurality of aspects of the present invention may be entirely or partially embodied.

FIG. 4 illustrates an example of a computer 2200 in which a plurality of aspects of the present invention may be entirely or partially embodied. A program that is installed in the computer 2200 can cause the computer 2200 to function as operations associated with apparatuses according to the embodiments of the present invention or one or more sections of the apparatuses thereof, or can cause the computer 2200 to perform the operations or the one or more sections thereof, and/or can cause the computer 2200 to perform processes of the embodiments according to the present invention or steps of the processes thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, and the like.

A program is provided by computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card, etc., and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on the computer 2200 or near the computer 2200. In addition, a recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

- 1: watching system
- 2: unmanned vehicle
- 3: apparatus
- 21: camera
- 22: communication apparatus
- 31: communication unit
- 32: display control unit
- 33: display unit
- 34: image capturing unit
- 35: detection unit
- 36: orientation changing unit
- 351: manipulation detecting unit
- 352: gaze location detection unit
- 353: subject detection unit
- 2200: computer
- 2201: DVD-ROM
- 2210: host controller
- 2212: CPU
- 2214: RAM
- 2216: graphics controller
- 2218: display device
- 2220: input/output controller
- 2222: communication interface
- 2224: hard disk drive
- 2226: DVD-ROM drive
- 2230: ROM
- 2240: input/output chip
- 2242: keyboard

What is claimed is:

1. An apparatus comprising:
   an acquisition unit configured to acquire a captured image from a camera that is capable of controlling an orientation;
   a display control unit configured to display the captured image onto a display screen;
   a detection unit configured to detect, within the display screen, a subject at which a user is looking continuously for at least a first reference duration; and
   an orientation changing unit configured to calculate, from a transition of a displayed image displayed on the display control unit, a moving speed of the subject within the displayed image, and to change an orientation of the camera, in response to a judgement that the subject falls out of the displayed image after a second reference duration has elapsed, in such a way that the subject does not fall out of the displayed image.

2. The apparatus according to claim 1, wherein the orientation changing unit is configured to change the orientation of the camera in such a way that the subject is located in a middle section of the displayed image.

3. The apparatus according to claim 2, wherein the detection unit is configured to detect a zooming operation to the subject from an eye movement of a user,
   the apparatus further comprising:
   a size changing unit configured to change a size of the subject within the display screen in accordance with the zooming operation.

4. A system comprising:
   the apparatus according to claim 3;
   a camera that is capable of controlling an orientation; and
   a communication apparatus configured to transmit, to the apparatus, an image captured by the camera.

5. The system according to claim 4, wherein the camera and the communication apparatus are mounted on an unmanned vehicle.

6. A system comprising:
   the apparatus according to claim 2;
   a camera that is capable of controlling an orientation; and
   a communication apparatus configured to transmit, to the apparatus, an image captured by the camera.

7. The system according to claim 6, wherein the camera and the communication apparatus are mounted on an unmanned vehicle.

8. The system according to claim 7, wherein the unmanned vehicle moves over a preset route.

9. The system according to claim 7, wherein the camera is a monitoring camera.

10. The apparatus according to claim 1, wherein the detection unit is configured to detect a zooming operation to the subject from an eye movement of a user,
    the apparatus further comprising:
    a size changing unit configured to change a size of the subject within the display screen in accordance with the zooming operation.

11. A system comprising:
    the apparatus according to claim 10;
    a camera that is capable of controlling an orientation; and
    a communication apparatus configured to transmit, to the apparatus, an image captured by the camera.

12. The system according to claim 11, wherein the camera and the communication apparatus are mounted on an unmanned vehicle.

13. The system according to claim 12, wherein the unmanned vehicle moves over a preset route.

14. The system according to claim 12, wherein the camera is a monitoring camera.

15. A system comprising:
the apparatus according to claim 1;
a camera that is capable of controlling an orientation; and
a communication apparatus configured to transmit, to the apparatus, an image captured by the camera.

16. The system according to claim 15, wherein the camera and the communication apparatus are mounted on an unmanned vehicle.

17. The system according to claim 16, wherein the unmanned vehicle moves over a preset route.

18. The system according to claim 16, wherein the camera is a monitoring camera.

19. A method comprising:
acquiring a captured image from a camera that is capable of controlling an orientation;
controlling display by causing the captured image to be displayed onto a display screen;
detecting, within the display screen, a subject at which a user is looking continuously for at least a first reference duration;
calculating, from a transition of a displayed image displayed on the display screen, a moving speed of the subject within the displayed image; and
changing an orientation of the camera, in response to a judgement that the subject falls out of the displayed image after a second reference duration has elapsed, in such a way that the subject does not fall out of the displayed image.

20. A non-transitory computer readable recording medium having recorded thereon a program which causes a computer to function as:
an acquisition unit configured to acquire a captured image from a camera that is capable of controlling an orientation;
a display control unit configured to display the captured image onto a display screen;
a detection unit configured to detect, within the display screen, a subject at which a user is looking continuously for at least a first reference duration; and
an orientation changing unit configured to calculate, from a transition of a displayed image displayed on the display control unit, a moving speed of the subject within the displayed image, and to change an orientation of the camera, in response to a judgement that the subject falls out of the displayed image after a second reference duration has elapsed, in such a way that the subject does not fall out of the displayed image.

* * * * *